July 5, 1966   J. DEZZANI   3,259,293
ARRANGEMENT FOR REMOVING AND APPLYING SOLDER
Filed Sept. 8, 1964
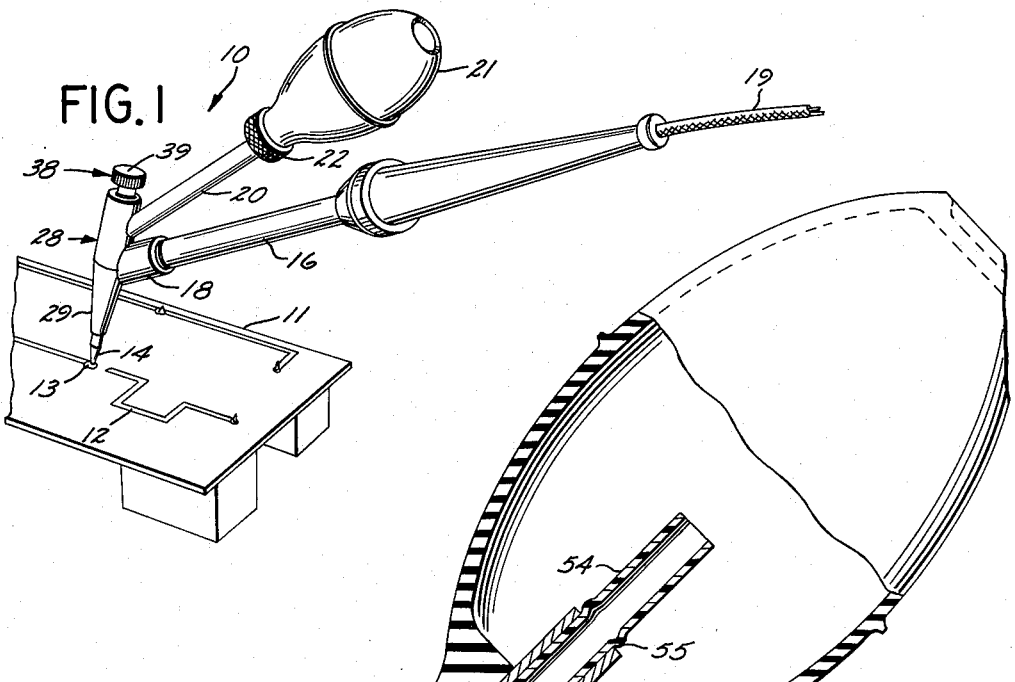
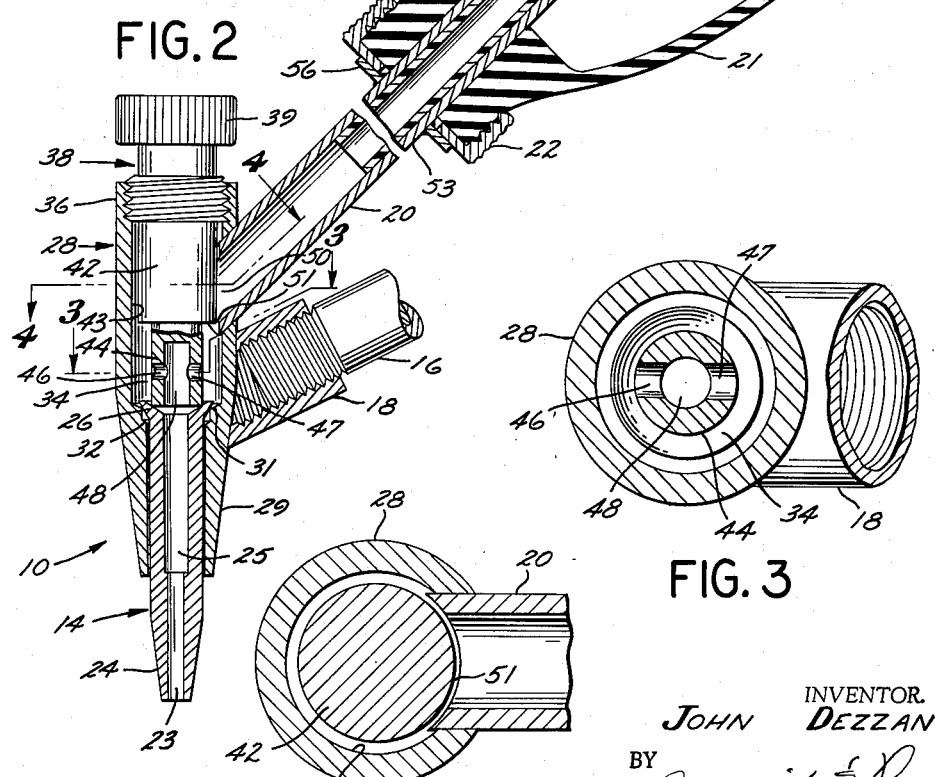
INVENTOR.
JOHN DEZZANI
BY
ATTORNEYS

United States Patent Office 3,259,293
Patented July 5, 1966

3,259,293
ARRANGEMENT FOR REMOVING AND
APPLYING SOLDER
John Dezzani, 8006 Otis St., Huntington Park, Calif.
Filed Sept. 8, 1964, Ser. No. 394,987
9 Claims. (Cl. 228—20)

The present invention relates to an arrangement for removing and disposing of or applying solder.

There are frequent occasions when solder must be removed from a joint, and this requires raising the solder to its melting point to separate the connected parts. An acceptable device for removing solder not only should avoid overheating of the parts engaged, but also should be easily manipulatable, readily maintained, yet inexpensive. Furthermore, it is very important that the removal of the molten solder from the joint being desoldered be complete (as well as rapid) in order to insure against the possibility of a short circuit caused by unremoved solder.

The prior art has attempted to solve these problems by drawing the molten solder away from the joint. One such attempt required the operator to orally suck the molten solder into a container. This solution, while somewhat effective in removing the molten solder from the joint, presented at least two further difficulties. Firstly, the oral aspiration is to inconsistent since it relies completely on a human operator to apply the proper amount of suction pressure. Secondly (and more importantly), the health of the operator is placed in jeopardy because of the possibility of inhalation of metal dust and poisonous and noxious fumes, such as lead oxide.

In soldering, fluxes inhibit the toxic effects of lead oxide but no such solution is available in the desoldering process. Consequently, the art has turned to other means to obviate any dangers to the operator. For example, mechanical means are now being employed to draw the molten solder away from the desoldered joint. The solder is then collected in a container, and the operator is protected. While accomplishing this purpose, such devices have presented still further difficulties. One new problem is that the solder tends to solidify along its route to the container and in the container. When this occurs, passage of further solder into the container may be partially or completely blocked, and it is necessary to clean out all areas leading to the container. Another problem that arises is that the container eventually becomes filled with collected solder. The container must then be emptied or even thrown away if there is too much adhesion of the solder to the interior walls of the container.

Thus, it is clear from the foregoing partial history of desoldering that the art solved many of the individual problems but not without creating a new problem and sometimes a more serious new problem. Moreover, many of the prior art devices are very complex, hard to operate and quite expensive to produce. In addition, some of the prior art apparatus requires frequent replacement of essential parts which increases down-time and renders them uneconomical.

Although many attempts were made to overcome the foregoing difficulties and other disadvantages, none, as far as I am aware, was entirely successful when carried into practice commercially on an industrial scale.

It has now been discovered that soldering and desoldering can be accomplished rapidly, completely safely and economically by soldering and desoldering means having a unique combination of special elements providing self-scavenging features.

It is an object of the present invention to provide novel apparatus for soldering and desoldering.

It is a further object of the present invention to provide soldering and desoldering apparatus which is self-scavenging.

Another object of this invention is the provision of soldering and desoldering apparatus having means for maintaining the solder molten throughout desoldering.

Still another object of the invention is to provide the novel soldering and desoldering apparatus with effective means for separating molten solder from gases during desoldering and means for inhibiting fall-out of molten solder from the apparatus.

The invention also contemplates providing a new and novel process for desoldering a soldered connection.

Other objects and advantages will become apparent from the following description taken in conjunction with the accompanying drawing in which:

FIGURE 1 is an isometric view of the present invention when used on a printed circuit board;

FIGURE 2 depicts a side elevation of the present invention in cross section;

FIGURE 3 is an enlarged cross section on line 3—3 of FIGURE 2, particularly showing certain novel features of this invention; and FIG. 4 is an enlarged cross section on line 4—4 of FIGURE 2, illustrating the constriction at the aspirator inlet to prevent the passage of solder.

Generally speaking, the present invention contemplates apparatus capable of soldering as well as desoldering a workpiece, such as a printed circuit board. The apparatus includes a hollow tip portion adapted to be placed near the workpiece. The tip includes an opening that communicates with a receptacle into which solder is drawn. A source of heat is included to maintain the tip at a temperature sufficient to melt the solder, and to keep the solder in a molten condition while it is within the receptacle. Solder is drawn into the receptacle by a source of vacuum, which conveniently is in the form of an aspirator bulb connected to the receptacle. There is only restricted communication between the receptacle and the bulb so that the solder is trapped in the chamber and will not be drawn into the bulb. Nevertheless, the connection to the bulb will remain open so that a vacuum can be created and solder always can be drawn inwardly, or can be forced out through the tip by action of the bulb. The solder can be exhausted completely so that none will remain in the unit to clog it. The passages through the unit from the tip to the chamber are arranged to prevent the solder from dropping out through the tip under the force of gravity.

With reference to the drawing, in FIGURE 1 the soldering and desoldering apparatus 10 is shown in operable relationship to a printed circuit board workpiece 11 having an electrically conductive circuit 12 on it. Typically, the device 10 may be used to remove solder from a joint 13 in the circuit 12. The tip 14 of the device 10 is placed directly over the area on the circuit board to be worked. A heating element, such as an electric soldering iron 16, is attached to the soldering and desoldering apparatus through lower angular extension 18, which should be made out of a material having good thermal conductivity, such as copper. The member 18 is threaded so that the heating element of a conventional soldering iron is readily attached to it. The tip of the iron is, of course, removed so that this attachment can be made. The heating element 16 has a cord 19 which leads to an electric power source, not shown.

The apparatus 10 also has an upper angular extension 20 disposed, for easy manipulation, directly above the lower extension 18. However, either extension can be located in another position on the apparatus, as those skilled in the art appreciate. An aspirator bulb 21 is attached to the upper angular extension. A knurled collar 22 assists in the assembly of the aspirator to the extension.

In addition, the knurled collar serves to restrain the aspirator from flaring as the aspirator is squeezed. This manually operated aspirator is quite satisfactory, although mechanically or electrically operated aspirators also may be used.

In operation, the heating element 16 conducts heat to the tip 14, which causes its temperature to rise above the melting point of solder. With the bulb 21 squeezed, the hot tip, which has a bore 23 through it, then is placed near the workpiece 11 to melt the solder. As the solder melts, the aspirator bulb 21 is released while the tip is maintained in the vicinity of the solder to be removed from the circuit board 11. The resulting vacuum through tip cavity 23 into the bulb 21 causes the solder to be drawn into the tip 14 and to flow into the apparatus 10. When the picked-up solder is to be removed, the operator merely moves the apparatus 10 away from the board 11 and expels the solder through the bore of the tip 14 by squeezing the aspirator bulb 21. It is clear that the gases and solder are retained in the apparatus until the operator resqueezes the bulb 21 and ejects the solder.

As is better illustrated in FIGURES 2 and 3, the tip 14 is externally tapered at the end 24 to be placed near the workpiece in order to better localize the heat generated by the heating element 16 and to provide better visibility for the operator. The tip 14, which is preferably made of copper, is a substantially tubular member having a longitudinal hollowed out bore or cavity section 23, as mentioned above. The opening 23 is advantageously stepped, having an upper section 25 of greater diameter than that near the end 24. Alternatively, it may have an upwardly divergent taper. This helps prevent the molten solder from dropping out of the tip 14. The upper end 26 of the member 14 is flared outwardly to provide a retaining shoulder to position the tip member with respect to the other parts of the unit.

The upper part of the tip 14 extends into a substantially cylindrical, tubular housing 28 having an externally tapered end portion 29 apertured to closely receive the periphery of the tip 14. Preferably, the housing is made of brass and is nickel-plated by the electrolysis process. Adjacent the end 26 of the member 14, the housing is provided with a pair of annular shoulders 31 and 32 that engage and retain the flared end of the tip.

Above the tip 14, the housing 28 defines a chamber 34 the upper end 36 of which is internally threaded. Stem 38, which has an external serrated head 39, threads into the end 36 of the housing 28 and extends into the chamber 34. The stem 38 includes a substantially cylindrical portion 42, which has a circumferential surface that approximates but is slightly spaced from the internal wall 43 of the chamber 34. A tubular portion 44 extends axially beyond the cylindrical part 42 of the stem, and at its end contacts the tip 14. This holds the tip in place with the flared end 26 in engagement with the shoulders 31 and 32. A pair of radial openings 46 and 47 extends through the wall of the tubular part 44 inwardly of its end, and through axial bore 48 communicates with the bore 25 of the tip 14.

The upper tubular extension 20 is angularly disposed relative to the housing, although it may be perpendicular thereto, as those skilled in the art will readily understand. In addition, the housing and extension may be formed of one piece or may be made unitary by welding, soldering or any of the other common joining processes. However, the two-piece construction is preferred so that the extension 20 may be made of a less thermally conductive material than that of the housing, to minimize heating of the bulb 21. Stainless steel is suitable for the member 20.

The extension 20 terminates at a port 50 closely spaced from the cylindrical portion 42 of the stem. It is positioned a distance from the element 42 such that molten solder cannot flow through the gap 51 into the tube 20. The dimension of this gap may vary with the viscosity of the solder, but the spacing is readily made such that the solder is blocked, yet air and gases can pass freely.

The other end 53 (the right-hand portion) of the extension 20 is provided with a tubular inner sleeve member 54 having a shoulder 55 for resting upon the end of the member 20. The sleeve 54 has an outside diameter substantially equal to the inside diameter of the extension 20 so that it fits snugly in extension 20. Advantageously, the sleeve 54 is made of a polytetrafluorethylene resinous thermoplastic material such as the one sold under the trademark "Teflon." Such thermoplastic materials are found not readily receptive to gas plating. Hence, gases will not deposit on the interior of the member 20, and this member and the bulb 21 are protected. Moreover, the sleeve member, being made of the foregoing materials, may be easily and cheaply replaced whenever it deteriorates after long use.

The aspirator bulb 21 is placed over and around the member 54 and extension 20, and is held from sliding down the extension by circular shoulder 56.

In operation of the device, the solder is drawn upwardly through the bore 23 of the tip 14, through the axial opening 48 of the tubular extension 44 of the stem and into the chamber 34 via the radial apertures 46 and 47. The chamber maintains the solder in the molten condition because it is kept at an elevated temperature by the heating element 16. The solder will not pass the small gap 51 between the tube 20 and the cylindrical portion 42 of the stem, and so will not travel into the bulb 21. The entire chamber is kept heated by the element 16, including the cylindrical portion 42 of the removable stem member 38. Hence, the solder stays molten at the point of separation from the gases and will not solidify so as to plug up the gap 51.

Also, the solder will not fall out of the device 10 because of the various obstructions to its passage which are provided. This includes the stepped configuration of the tip 14 and the communication between the chamber 34 and the bore 23 of the tip only through the radial openings 46 and 47. In addition, positioning these openings above the lower end of the stem and the bottom of chamber 34 assists in retaining the solder in the unit so that it will come out only when the bulb 21 is compressed. These obstructions and variations in the solder path within the unit also help to break up the solder and to further assure that solder particles will not enter the aspirator bulb 21.

Despite these provisions to maintain the solder in the unit, when the bulb 21 is squeezed, the solder is completely and readily ejected from the unit 10, and none will be retained to clog it up. The fact that the surfaces contacted by the solder are not tinned assists in preventing the solder from dropping out of the unit by gravitational forces, yet at the same time facilitates complete ejection of the solder when the bulb is squeezed. Unlike prior solder-removing devices, this invention can be used over long periods of time without internal solder build-up.

The device of this invention is quite versatile in nature. It finds considerable use as a solder-extracting device to remove the solder from joints as needed. In such use, normally the solder is first withdrawn into the chamber 34 and then ejected into a waste container. However, the solder may be replaced on the joint from which it was removed or any other joint simply by bringing the tip 14 into contact with the work and then squeezing the bulb 21 so as to force the solder outwardly. In fact, the device can be used as a conventional soldering iron if desired because the tip 14 will effectively heat the parts so that the solder can be melted to effect the joint.

One of the advantages of the unit is that the tip 14 is readily removable whenever it deteriorates or for replacement with a tip of different configuration. Various jobs may require tips that are curved or otherwise different from the straight tip illustrated. Disassembly is easily effected by unthreading the stem 38 so that maintenance or tip variation is no problem. In addition to this, the unit is durable in nature and simple in its construction.

The present invention contemplates a process for desoldering a soldered connection, as well as the apparatus described above. According to this process, the frozen solder of the connection is melted. Advantageously, heat is applied to the solder at the soldered connection rapidly. A gaseous pressure differential, such as suction, is then directed to the molten solder to cause the molten solder to flow in a direction away from the desoldered joint. The molten solder is separated from any gas present while the solder is retained in the molten state. Advantageously, the molten solder and gas are drawn through a plurality of separation steps, and the gas is retained in a separate chamber. After separation, the solder is retained in the molten condition and is restrained from movement. It is then advantageous to move the solder and gas from the area of the desoldered connection and to apply pressure to the collected gas to cause the gas to flow in a direction opposite to the flow direction caused by the initial pressure differential and against the collected solder. The solder is thereafter ejected by the oppositely flowing gases away from the desoldered joint.

As was previously set forth, this invention is particularly applicable to the soldering and desoldering of electrical connections such as those commonly found in printed circuit board applications. However, the present invention also finds wide utility in most other soldering and desoldering situations. In addition, the present invention is useful in fusing and/or melting other joints whether formed by solder or otherwise. For example, it can be effectively employed in melting plastics, drawing the melted plastic away from its now undesired location and thereafter disposing of the molten plastic. Moreover, coated articles can have their coatings safely removed from the basic material by applying the teachings and principles of this invention thereto.

The foregoing detailed description is to be clearly understood as given by way of illustration and example only, the spirit and scope of this invention being limited solely by the appended claims.

I claim:

1. A device for removing and applying solder comprising
   a housing,
      said housing having a chamber therein,
   a tip member extending outward from said housing,
      said tip member having a distal end adapted to engage a workpiece
         and a bore extending from said distal end to said chamber,
   a heater connected to said housing for elevating said chamber and said tip member to a temperature above the melting point of solder,
   a tube connected to said chamber
      and extending outwardly therefrom,
   an aspirator connected to said tube for creating vacuum and pressure within said chamber,
   and restrictor means interposed between said chamber and said tube for precluding the flow of solder from said chamber into said tube,
   said heater being in heat transfer relationship with said restrictor means for maintaining said restrictor means at an elevated temperature and preventing solidification of solder particles at said restrictor means.

2. A device as recited in claim 1 in which
   said tip member is removable from said housing,
      the aperture in said tip member being of larger lateral dimension adjacent said chamber than it is at said distal end of said tip member.

3. A device as recited in claim 1 in which
   said chamber includes a cylindrical inner wall,
   said restrictor including a cylindrical member of slightly smaller diameter than the diameter of said cylindrical wall
      for thereby providing a restricted entrance to said tube.

4. A device as recited in claim 3 including a tubular member in said chamber interposed between said tip and said cylindrical member, said tubular member having radial aperture means inwardly of said tip for providing communication between said bore of said tip and said chamber.

5. A device for removing and applying solder comprising
   a housing,
      said housing having a chamber therein,
   a tip member extending outwardly from said housing,
      said tip member having a distal end adapted to engage a workpiece,
      and a bore extending from said distal end to said chamber,
   a tube connected to said chamber and extending outwardly therefrom,
   an aspirator means connected to said tube for creating vacuum and pressure within said chamber,
      said tube having an open end in said chamber,
   a surface means in said chamber adjacent said open end and closely spaced therefrom so as to provide a restricted opening from said chamber into said tube,
   and heater means for maintaining said housing, tip and surface means at an elevated temperature for melting solder contacted by said tip and preventing solidification of said solder in said chamber.

6. A device as recited in claim 5 in which
   said surface means is substantially cylindrical,
   and said end of said tube is arcuate and defined by a segment of a cylinder so as to provide a relatively narrow gap between said cylindrical surface and said tube end.

7. A device for removing and applying solder comprising
   a housing,
      said housing having a chamber therein,
   a tip member extending outwardly from said housing,
      said tip member having a distal end adapted to engage a workpiece
         and having an inner end having abutment means thereon engaging a surface in said housing for preventing outward movement of said tip member,
      said tip member having a bore extending from said distal end to said chamber,
   a removable member extending into said chamber,
      said removable member having an end engaging said tip member for holding said abutment means of said tip member in engagement with said surface of said housing for thereby retaining said tip member,
         and for permitting removal of said tip member from said chamber upon removal of said removable member,
      said removable member having opening means providing communication between said bore and said chamber,
   a tube connected to said housing,
      said tube having an end extending into said chamber, said removable member having a surface adjacent said end and spaced therefrom so as to provide a relatively narrow elongated opening between said chamber and said tube,
   an aspirator means connected to said tube for creating vacuum and pressure within said chamber,
   and heater means connected to said housing for maintaining said housing, tip member and removable member at an elevated temperature for melting and maintaining in a molten condition solder engaged thereby.

8. A device for removing and applying solder comprising
a housing,
  said housing having an opening therethrough defining a chamber therein,
a tip member extending outwardly of said chamber through one end of said opening,
  said tip member having abutment means engaging surface portions of said chamber for preventing outward movement of said tip member,
  said tip member having a bore therethrough,
a removable member connected to said housing and extending into said opening at the opposite end thereof,
  said removable member having an end engaging said tip member for normally holding said abutment means of said tip member in said engagement with said surface in said chamber,
    and for permitting removal of said tip member from said chamber through said opposite end of said opening when said removable member is removed from said chamber,
  said end of said removable member having aperture means therethrough providing open communication between said bore of said tip member and said chamber,
a tube connected to said housing,
  said tube having an end in said chamber,
  said removable member having surface means adjacent said end,
    and closely spaced therefrom to define a relatively narrow elongated gap between said end and said removable member,
      whereby there is restricted access from said chamber to said tube past said surface means of said removable member,
an aspirator means connected to said tube for creating vacuum and pressure within said chamber,
and heater means connected to said housing for elevating said housing, tip member and removable member to a temperature above the melting point of solder.

9. A device as recited in claim 8 in which
said removable member is threaded into said opposite end of said opening in said housing,
  said surface means of said removable member being substantially cylindrical,
  said end of said tube being defined by a segment of a cylinder exteriorly of and substantially uniformly spaced from said cylindrical surface means to provide said relatively narrow gap.

References Cited by the Examiner

UNITED STATES PATENTS

| | | | |
|---|---|---|---|
| 2,826,667 | 3/1958 | Brillinger | 228—20 |
| 2,955,188 | 10/1960 | Campo | 228—20 |
| 2,960,591 | 11/1960 | Brillinger | 228—20 |
| 3,172,382 | 3/1965 | Weglin | 228—20 |

FOREIGN PATENTS

| | | |
|---|---|---|
| 693,197 | 6/1953 | Great Britain. |

JOHN F. CAMPBELL, *Primary Examiner.*

WHITMORE A. WILTZ, *Examiner.*

M. L. FAIGUS, *Assistant Examiner.*